Sept. 8, 1970  E. J. TUTHILL ET AL  3,527,350
APPARATUS FOR CONTINUOUS CHROMATOGRAPHY
Filed Aug. 25, 1969

INVENTOR.
EDWIN J. TUTHILL
BY JOSEPH FEDELEM
Roland A. Anderson
Attorney

United States Patent Office 3,527,350
Patented Sept. 8, 1970

3,527,350
APPARATUS FOR CONTINUOUS CHROMATOGRAPHY
Edwin J. Tuthill, Belle Terre, and Joseph Fedelem, Blue Point, N.Y., assignors to the United States of America as represented by the United States Atomic Energy Commission
Filed Aug. 25, 1969, Ser. No. 852,701
Int. Cl. B01d *15/08*
U.S. Cl. 210—198      3 Claims

ABSTRACT OF THE DISCLOSURE

An apparatus for effectuating continuous chromatographic separations comprising a disc shaped rotating chamber filled with chromatographic material with the carrier fluid radiating outwardly through the chamber and sequentially spaced mixture entry and separate species exit ports orthogonally connected to the chamber between the center and edge of the disc. The orthogonally connected exits ports allow the slowest moving component to be removed before species intermixture can occur.

BACKGROUND OF INVENTION

The invention described herein was made in the course of, or under a contract with the United States Atomic Energy Commission.

All chromatographic techniques depend upon the different attraction which two alternative phases have for the components of the material to be separated. In conventional chromatographic techniques the components are carried through adsorbent phase by a carrier phase.

A typical chromatographic setup includes a column packed with a finely divided absorbent phase material and containing a plug that allows liquid to pass through while retaining the packing. The column is first wetted with the solvent carrier phase, and then a concentrated solution of the sample to be chromatographed containing the mixture to be separated and the solvent phase (eluant) is introduced at the top of the column. After all of the sample has flowed into the packing, it is followed by eluant until all of the original sample has passed out of the column, with the components being effectively separated by variation of their rate of flow through the column due to their varying phase attractive forces.

Those skilled in the art have long sought methods of avoiding the limits of throughput batch type operation imposed wherein conventional techniques and advantages can be employed in effectuating continuous chromatographic separation processes.

SUMMARY OF THE INVENTION

We have discovered an apparatus capable of continuously separating the components of a mixture of chemical species comprising: a rotatable disc shaped chamber filled with particulate chromatographic adsorption material capable of rotating around a central axle, said chamber being divided into a plurality of separate sub-cavities by individual septa radiating out from the axle to the outer edge of the chamber; means for rotating the chamber; means for centrally introducing a continuous flow of carrier fluid into the chamber so that said carrier fluid flows uniformly radially outward through the chamber; an entry port for introducing a mixture, containing at least two chromatographically separable species, orthogonally connected into said chamber at a point between the means for introducing the carrier fluid and the outer edge of the disc shaped chamber; a plurality of product segregation ports orthogonally connected into said chamber suitably spaced between the entry port and the outer edge of the chamber, capable of selectively removing segregated portions of the carrier fluid containing separated species as they selectively radiate outward from the center of the chamber, so as to permit effective chromatographic separation of the species contained in the mixture.

In the preferred embodiment of our invention we utilize an axle which is a tube having a porous wall for that portion of the axle that is contained in the chamber as the means for introducing the continuous flow of carirer fluid into the chamber. We also employ in the preferred embodiment of our invention a disc shaped chamber made up of two parts, a bottom rotatable portion containing the chromatographic bed movably mounted on a non-rotatable top cover which contains the mixture entry port and the sepcies exit ports orthogonally connected thereto and operatively connected to the rotating bed.

DESCRIPTION OF THE PREFERRED EMBODIMENT

Figure 1:
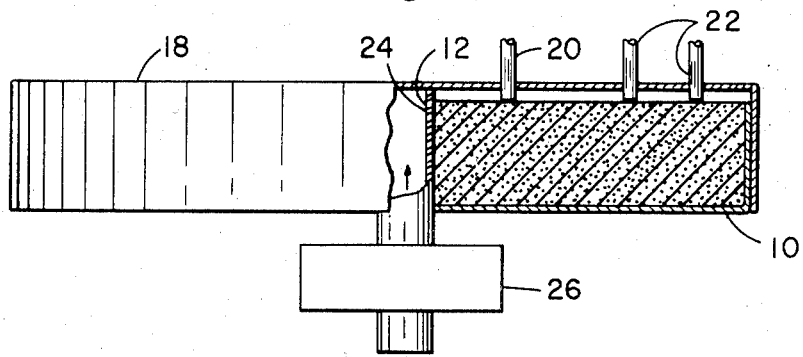
FIG. 1 shows an elevated view in partial cross-section of an apparatus constructed in accordance with this invention.
Figure 2:
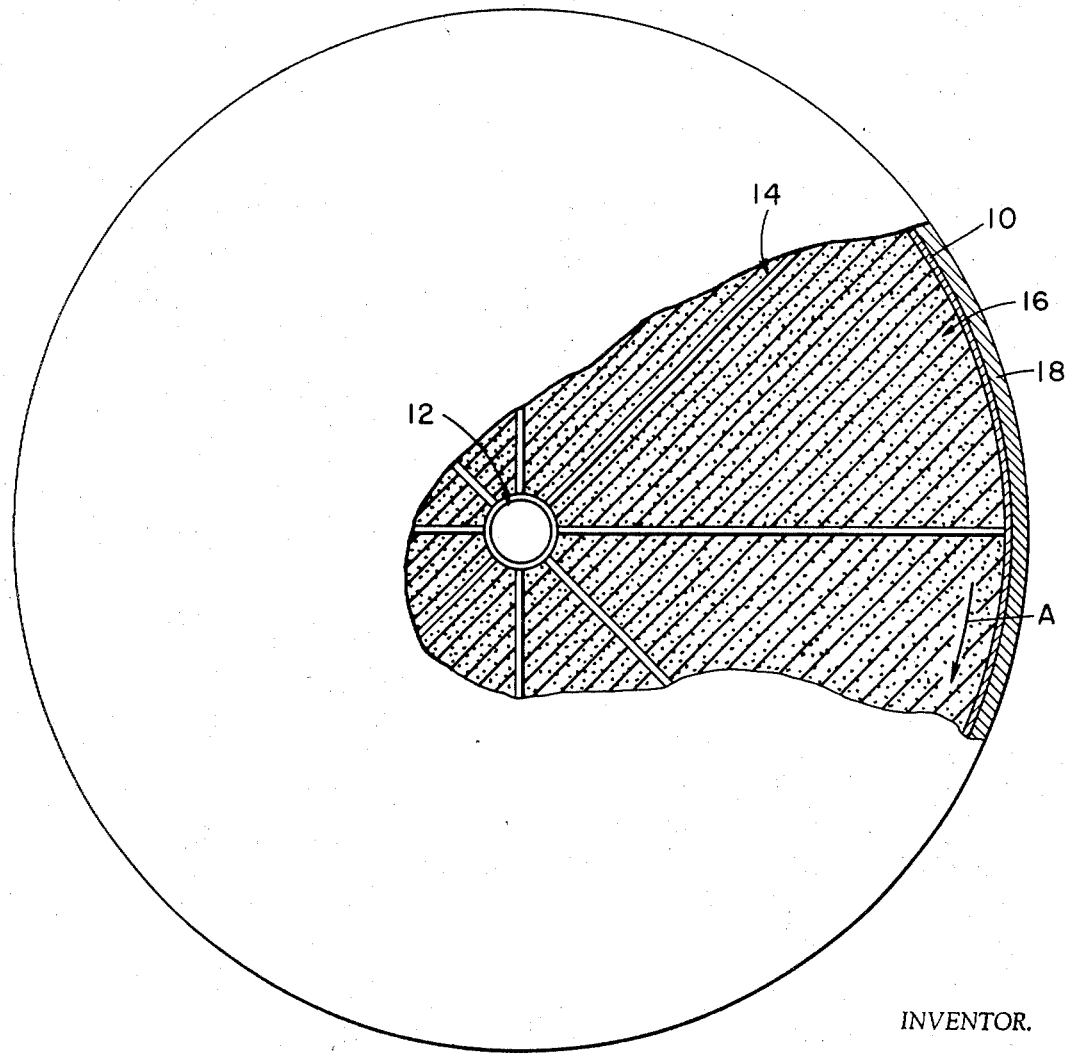
FIG. 2 shows a section along 2—2 of FIG. 1.

FIG. 1 shows an elevated view in partial cross-section of our invention which consists of a rotatable disc shaped chamber made up of a rotatable base member 10 for holding the chromatographic adsorption material 16 which base member 10 is enclosed in a non-rotating manifold 18. The base member 10 is fixedly attached to a hollow axle 12 which axle 12 is operatively connected to rotational means 26 so that rotation of the axle 12 will cause the rotation of the base member 10 within manifold 18.

That portion of the axle 12 which is within the chamber defined by the base member 10 and manifold 18 contains pores (24) so that chromatographic carrier fluid can be introduced into the chamber in a manner such that it will uniformly radiate outwardly from the center of the chamber through the chromatographic adsorption material 16.

Entry port 20 mounted on the manifold 18 permits the introduction of mixtures containing at least two chromatographically separable species into the chromatographic adsorption material 16. Exit ports 22 mounted in the manifold 18 are orthogonally connected with the chromatographic adsorption material and are located so as to permit individual removal of the species after they have been chromatographically separated during operation of the system together with permitting removal of the carrier fluid.

Septa 14 are provided so as to separate the chamber formed by the base member 12 and the manifold 18 into separate individual sub-cavities. These septa prevent side migration of the individual subspecies as they are borne along by the carrier fluid and aid in keeping the chromatographic adsorption material 16 in place.

The spacing of the entry ports will of course be determined by the vector angle of separation for the species as they are transported through the adsorbent material 16 and should vary from each other by about 4° or more. This vector angle will of course be determined by proper bed selection, carrier selection and the effectiveness of both in increasing the rate of separation for a particular system. Materials capable of significant separation by conventional chromatographic columns can be separated more advantageously by use of our system. Thus the location of the entry and exit ports can readily be determined by direct experiment with our apparatus using a trial and error method or the rate of separation of the species can be determined by use of conventional chromatographic columns and extrapolated into a similar system using our novel apparatus taking into account flow rate and the effect of rotational forces on the system.

The use of orthogonally connected species take off ports gives us the unique advantage of preventing species intermixture. If non-orthogonal species take off ports located at the outer edge of the disc shaped chamber were employed, the throughput and rotation of the system to the speed of the slowest component, whereas in ours we remove the species as soon as separation occurs. This is especially advantageous when it is desirable to separate mixtures containing three or more species.

We get a lateral displacement of the components due to rotation together with a linear displacement due to uniform carrier fluid flow radiating exocentrally from the center of the system. This added vector force permits continuous separation in contrast to the lineal flow of conventional columns which do not permit continuous separations. It is of course to be understood that the illustration of the practice of our invention shown in figures is merely indicative of one specific way of constructing our apparatus in accordance with the principles disclosed herein and is not to be construed as to limitation thereof. This illustration shows the chamber constructed in two parts and it would be obvious that the bed could be constructed of a single piece. The carrier fluid could be introduced by a separate port not connected with the axle.

The chromatographic adsorption materials useful in our invention can be of any of the conventional materials ordinarily employed in preparing conventional chromatographic columns, i.e., synthetic resins, paper, aluminum oxide particles, etc. Conventional carrier fluids (eluants) can be employed on our novel apparatus, i.e., alcohol, water, etc. It is to be understood that our invention is directed to a deployment of conventional chromatographic materials and techniques in a novel apparatus.

In operation the rotating disc shaped chamber containing the bed having carrier fluid uniformly radiating outward from the center through the bed will have the mixture added to the bed and borne along by the carrier fluid until the species contained therein have separated, whereupon the species will be orthogonally removed from the system. The rate of rotation is geared to permit adequate separation and is maintained low enough to prevent species intermixture.

What is claimed is:

1. An apparatus capable of continuously separating the components of a mixture of chemical species comprising:

(a) a rotatable disc shaped chamber filled with particulate chromatographic adsorption material capable of rotating around a central axis; said chamber being divided into a plurality of separate sub-cavities by individual septa radiating out from the axle to the outer edge of the chamber;
 (b) means for rotating the chamber;
 (c) means for centrally introducing a continuous flow of carrier fluid into the chamber so that said carrier fluid flows uniformly radially outward through the chamber;
 (d) an entry port for introducing a mixture, containing at least two chromatographically separable species, orthogonally connected into said chamber at a point between the means for introducing the carrier fluid and the outer edge of the disc shaped chamber;
 (e) a plurality of product segregation ports orthogonally connected to said chamber and suitably spaced between the entry part and the outer edge of the disc shaped chamber, capable of selectively removing segregated portions of the carrier fluid containing separated species as they selectively radiate outward from the center of the chamber, so as to permit effective chromatographic separation of the species contained in the mixture.

2. The apparatus of claim 1 wherein the axle is a tube having a porous wall for that portion of the axle which is within the chamber which can be utilized as the means for introducing the carrier fluid into the chamber.

3. The apparatus of claim 2 wherein the disc shaped chamber is formed by two parts, a bottom rotatable portion containing the chromatographic bed and septa movably mounted in a non-rotatable top cover which contains the mixture entry port and the species exit ports orthogonally connected thereto and operatively connected to the bed.

References Cited

FOREIGN PATENTS 811,627  4/1959  Great Britain.

JAMES L. DE CESARE, Primary Examiner

U.S. Cl. X.R.

55—386